(12) United States Patent
Schoisswohl et al.

(10) Patent No.: US 7,428,334 B2
(45) Date of Patent: Sep. 23, 2008

(54) METHODS AND SYSTEMS FOR 3D SEGMENTATION OF ULTRASOUND IMAGES

(75) Inventors: Armin Schoisswohl, Wels (AT); Johannes Ruisz, Vienna (AT)

(73) Assignee: General Electric Company, Schenectady, NY (US)

( * ) Notice: Subject to any disclaimer, the term of this patent is extended or adjusted under 35 U.S.C. 154(b) by 804 days.

(21) Appl. No.: 10/927,827

(22) Filed: Aug. 27, 2004

(65) Prior Publication Data

US 2006/0056690 A1 Mar. 16, 2006

(51) Int. Cl.
*G06K 9/34* (2006.01)
*G06K 9/00* (2006.01)

(52) U.S. Cl. .................. 382/173; 382/128; 382/154; 382/199

(58) Field of Classification Search ........... 382/128, 382/173, 154, 199
See application file for complete search history.

(56) References Cited

U.S. PATENT DOCUMENTS

| | | | |
|---|---|---|---|
| 5,540,229 A | | 7/1996 | Collet-Billon et al. |
| 5,562,095 A | * | 10/1996 | Downey et al. ............. 600/445 |
| 6,385,332 B1 | * | 5/2002 | Zahalka et al. .............. 382/128 |
| 6,785,409 B1 | * | 8/2004 | Suri ........................... 382/128 |
| 2003/0220569 A1 | | 11/2003 | Dione et al. |
| 2003/0236462 A1 | | 12/2003 | Salgo et al. |
| 2005/0276455 A1 | * | 12/2005 | Fidrich et al. ............... 382/128 |

* cited by examiner

*Primary Examiner*—Bhavesh Mehta
*Assistant Examiner*—John B Strege
(74) *Attorney, Agent, or Firm*—The Small Patent Law Group; Dean D. Small

(57) ABSTRACT

A method for three dimensional (3D) segmentation of an object is provided. The method obtains a volumetric data set containing object data and non-object data in proximity to the object data, the object data having a reference axis extending through the object data. The method defines at least one reference slice and multiple object slices within the volumetric data set, the reference slice and the object slices intersecting one another along the reference axis and containing the reference axis. Reference points are determined within the reference slice at edges of the object data. With reference points determined, the method generates an estimated contour extended through the reference and object slices based on the reference points, the estimated contour intersecting the object slices to define estimated contour points. The method then adjusts the estimated contour points until corresponding substantially to actual contour points of the object data.

22 Claims, 9 Drawing Sheets

METHODS AND SYSTEMS FOR 3D SEGMENTATION OF ULTRASOUND IMAGES

BACKGROUND OF THE INVENTION

The present invention relates to diagnostic ultrasound methods and systems. In particular, the present invention relates to methods and systems for segmenting three dimensional (3D) ultrasound datasets.

Numerous ultrasound methods and systems exist for use in the medical diagnostics. Various features have been proposed to facilitate patient examination and diagnosis based on ultrasound images of the patient. For example, certain systems offer an image segmentation feature through which a 2D image is analyzed to identify portions of the 2D image that represent object and non-object regions. A local contour may be determined through various techniques, including, but not limited to, measures of texture and gray level changes in the image data. An automatic segmentation algorithm may be used to determine the local contour of the object within an object slice. More recently, techniques have been introduced to obtain ultrasound information for a 3D volume. The ultrasound information is stored as a volumetric data set. Individual images or slices are extracted from the volumetric data set for analysis, such as through segmentation.

Heretofore, ultrasound methods and systems were unable to perform segmentation rapidly upon the volumetric data set.

A need exists for improved methods and systems that are able to segment a volumetric data set.

BRIEF DESCRIPTION OF THE INVENTION

A method for three dimensional (3D) segmentation of an object is provided. The method obtains a volumetric data set containing object data and non-object data in proximity to the object data, the object data having a reference axis extending through the object data. The method defines at least one reference slice and multiple object slices within the volumetric data set, the reference slice and the object slices intersecting one another along the reference axis and containing the reference axis. Reference points are determined within the reference slice at edges of the object data. With reference points determined, the method generates an estimated contour extended through the reference and object slices based on the reference points, the estimated contour intersecting the object slices to define estimated boundary points. The method then adjusts the estimated boundary points until corresponding substantially to actual boundary points of the object data.

A system for three dimensional (3D) segmentation of an object is provided. The system includes memory storing a volumetric data set containing object data and non-object data in proximity to the object data, the object data having a reference axis extending through the object data. The system includes a processing unit defining at least one reference slice and multiple object slices within the volumetric data set, the reference slice and the object slices intersecting one another along the reference axis and containing the reference axis. The processing unit determines, within the reference slice, reference points at edges of the object data. The system includes a contour estimator generating an estimated contour extended through the reference and object slices based on the reference points, the estimated contour intersecting the object slices to define estimated boundary points in each object slice. The system includes a boundary adjustment unit adjusting the estimated boundary points until corresponding substantially to actual boundary points of the object data.

DETAILED DESCRIPTION OF THE INVENTION

Figure 1:
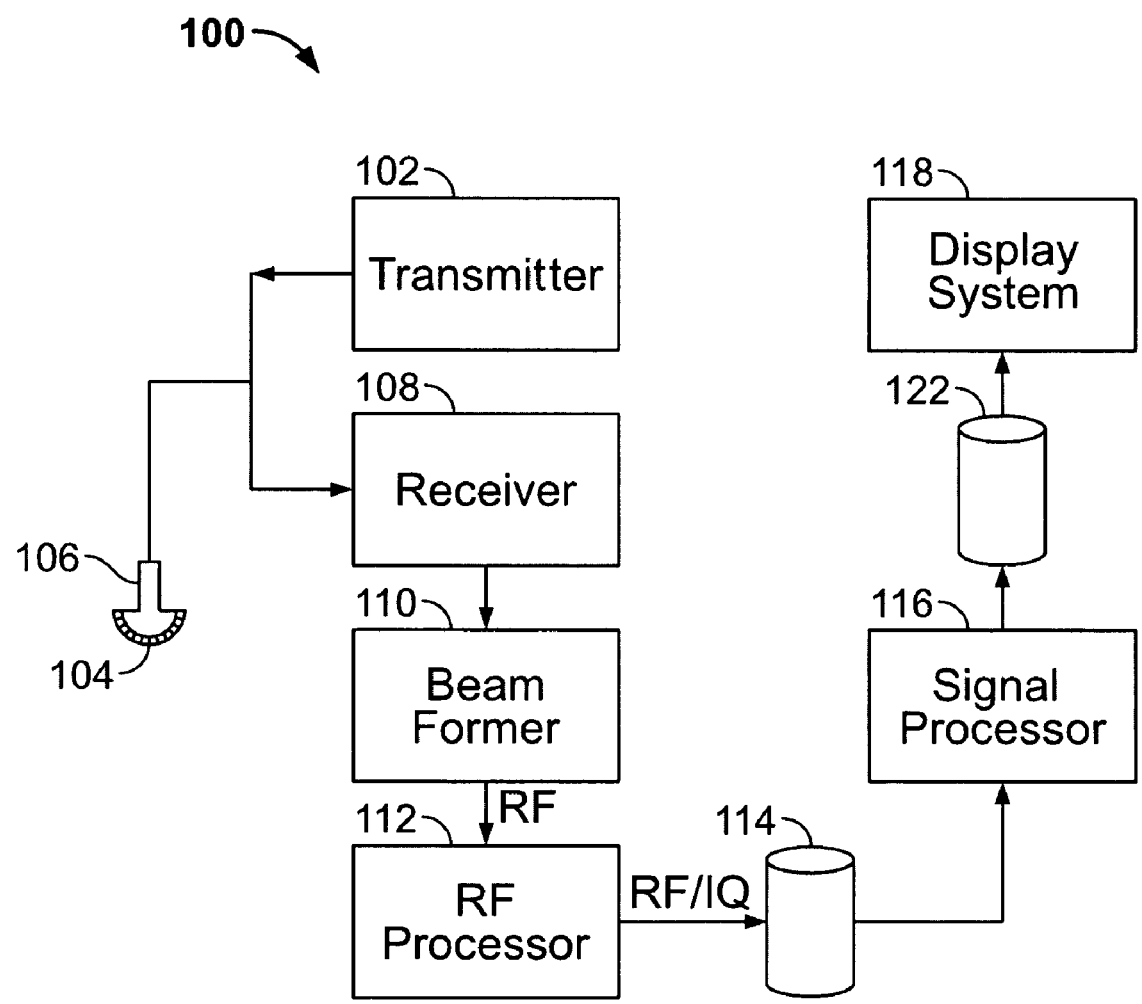
FIG. 1 is a block diagram of an ultrasound system formed in accordance with an embodiment of the present invention.

FIG. 1 is a block diagram of an ultrasound system 100 formed in accordance with an embodiment of the present invention. Ultrasound system 100 includes a transmitter 102 that drives a plurality of transducer elements 104 within an array transducer 106 to emit pulsed ultrasound signals into a body. A variety of geometries may be used. The ultrasound signals are back-scattered from density interfaces and/or structures in the body, like blood cells or muscular tissue, to produce echoes which return to transducer elements 104. A receiver 108 receives the echoes. The received echoes are passed through a beamformer 110, which performs beamforming and outputs a RF signal. The RF signal then passes through a RF processor 112. Alternatively, RF processor 112 may include a complex demodulator (not shown) that demodulates the RF signal to form IQ data pairs representative of the echo signals. The RF or IQ signal data may then be routed directly to RF/IQ buffer 114 for temporary storage.

Ultrasound system 100 also includes a signal processor 116 to process the acquired ultrasound information (i.e., RF signal data or IQ data pairs) and prepare frames of ultrasound information for display on display system 118. Signal processor 116 is adapted to perform one or more processing operations according to a plurality of selectable ultrasound modalities on the acquired ultrasound information. In the exemplary embodiment, acquired ultrasound information is processed in real-time during a scanning session as the echo signals are received. In an alternative embodiment, the ultrasound information may be stored temporarily in RF/IQ buffer 114 during a scanning session and processed in less than real-time in a live or off-line operation.

Ultrasound system 100 may continuously acquire ultrasound information at a frame rate that exceeds fifty frames per second, which is approximately the perception rate of the human eye. The acquired ultrasound information may be displayed on display system 118 at a slower frame-rate. An image buffer 122 is included for storing processed frames of acquired ultrasound information that are not scheduled to be displayed immediately. In the exemplary embodiment, image buffer 122 is of sufficient capacity to store at least several seconds worth of frames of ultrasound information. The frames of ultrasound information are stored in a manner to facilitate retrieval thereof according to its order or time of acquisition. Image buffer 122 may include at least one memory device, such as, but not limited to, a random access memory (RAM) or other known data storage medium.

Figure 2:
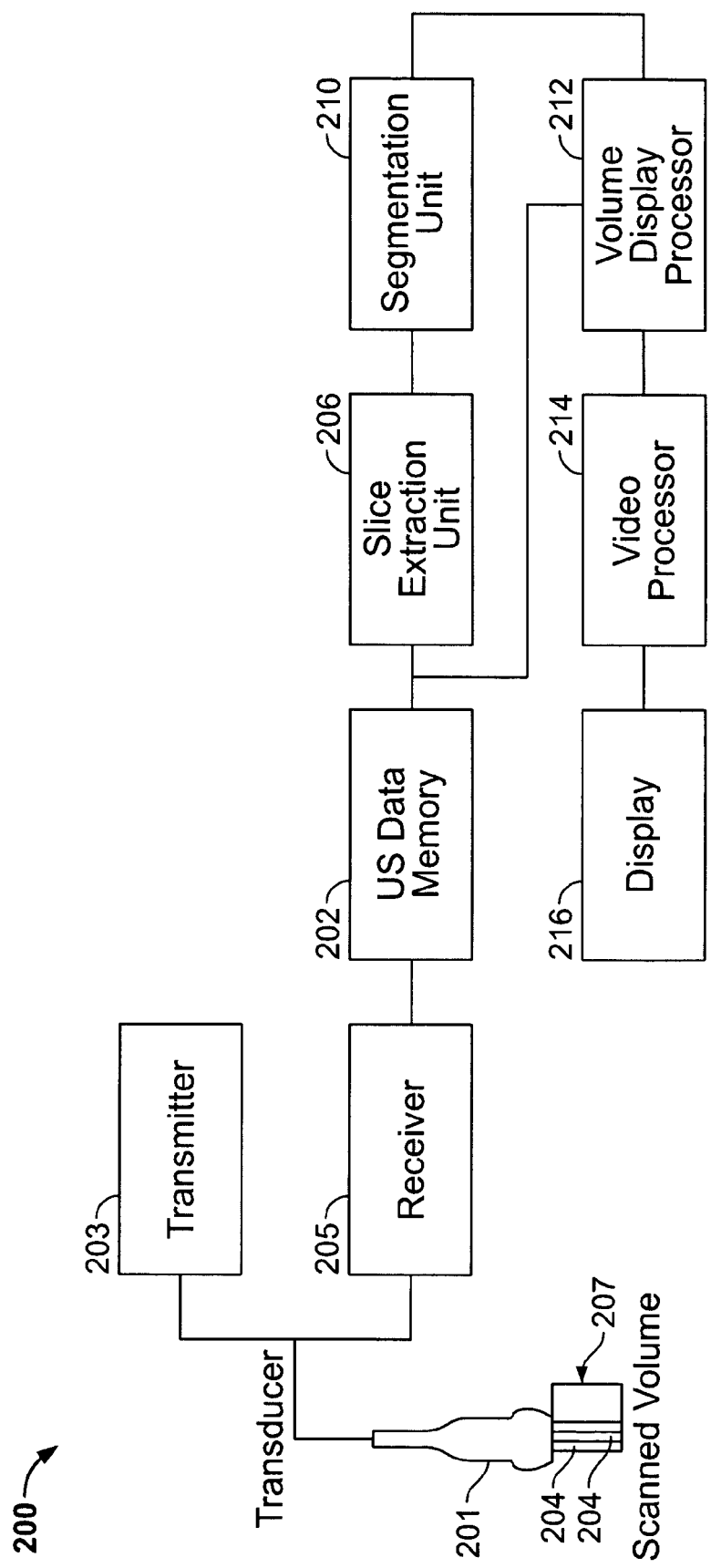
FIG. 2 is a block diagram of an ultrasound system formed in accordance with an alternative embodiment of the present invention.

FIG. 2 is a block diagram of an ultrasound system 200 formed in accordance with an alternative embodiment of the present invention. The system 200 includes array transducer 201 connected to transmitter 203 and a receiver 205. The array transducer 201 transmits ultrasound pulses and receives echoes from structures inside of a scanned ultrasound volume 207. A memory 202 stores ultrasound data from the receiver 205 derived from the scanned ultrasound volume 207. The volume 207 may be obtained by various techniques, for example, but not limited to, 3D scanning, real-time 3D imaging, volume scanning, 2D scanning with transducers having positioning sensors, freehand scanning using a Voxel correlation technique, 2D or matrix array transducers.

The transducer 201 may be moved, such as along a linear or arcuate path, while scanning a region of interest (ROI). At each linear or arcuate position, the transducer 201 obtains a plurality of scan planes 204. The scan planes 204 are stored in the memory 202, and then passed to a slice extraction unit 206. In some embodiments, the transducer 201 may obtain lines instead of the scan planes 204, and the memory 202 may store lines obtained by the transducer 201 rather than the scan planes 204. The data slices are passed to a segmentation unit 210 that extracts object contours from the slice data. The output of the segmentation unit 210 is passed to a volume display processor 212 together with the ultrasound (US) data. The output of the volume display processor 212 is passed to a video processor 214 and then to a display 216.

Figure 3:
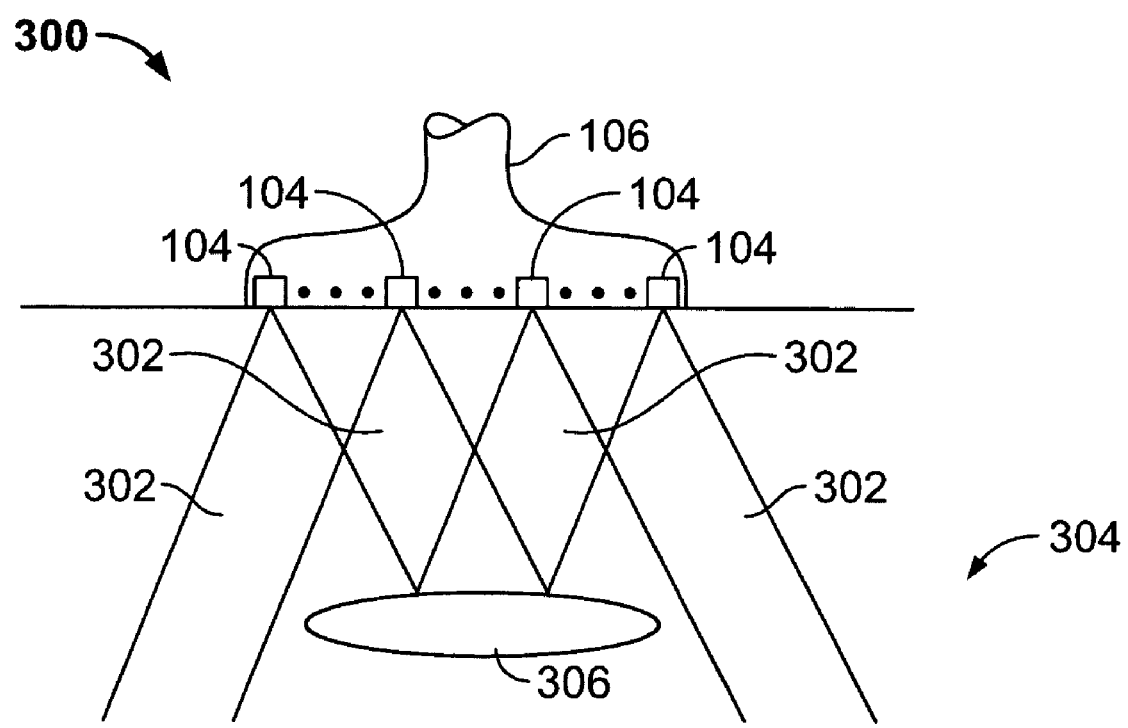
FIG. 3 is a diagram illustrating an exemplary scan of an object acquired by the ultrasound system shown in FIG. 1.

FIG. 3 illustrates an exemplary scan 300 of an object 306 acquired by the system 100 (shown in FIG. 1). Array transducer 106 includes a plurality of transducer elements 104 positioned linearly along an edge of transducer 106. Transducer elements 104 are coupled to transmitter 102 and receiver 108 (shown in FIG. 1) and are responsive to transmit signals from transmitter 102 to generate an ultrasound beam or wave 302 that emanates from the edge of array transducer 106 proximate each transducer element 104. The transmit signals may be phased to control the firing of each transducer element 104 to steer ultrasound wave 302 along a predetermined path. For illustration purposes only, four transducer elements 104 are illustrated. Array transducer 106 may include any number of transducer elements 104. Each wave 302 is projected into a volume of interest 304 that may contain an object of interest 306 and may overlap one or more of waves 302 emanating from adjacent transducer elements 104. Object 306 may absorb, transmit, refract and/or reflect waves 302 that impact object 306. Reflected waves or echoes from object 306 are received by transducer elements 104 and processed by system 100 to create image or steering frames indicative of the object 306 and other objects within volume 304.

Figure 4:
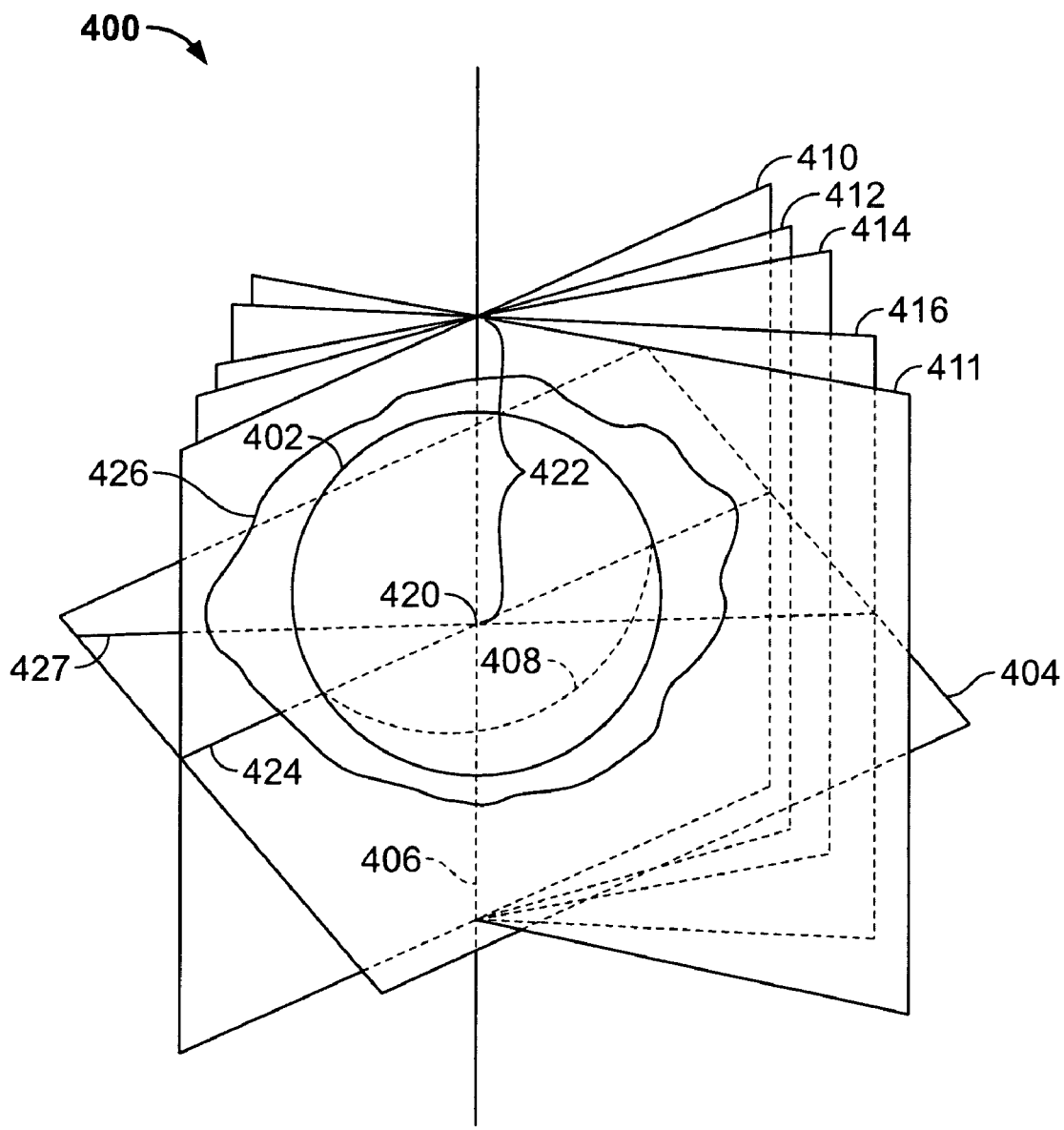
FIG. 4 is a perspective view of a volumetric data set containing an object and sliced in accordance with an embodiment of the present invention.

FIG. 4 illustrates a perspective view of a volumetric data set 400 containing an object 426 that is generally spherical in shape and sliced in accordance with an embodiment of the present invention. The ultrasound system 200 obtains the volumetric data set (VDS) 400 containing object data and non-object data in proximity to the object data. The obtained data defines an object 426 and may be stored in a memory, such as the memory 202 of FIG. 2. The object 426 may or may not have a spherical shape. As explained below, an estimated spherical contour volume 402 is defined within the object 426 and is used as an initial starting point for an outward growth process. The process iteratively expands the contour volume 402 outwards until approximating the shape of the object 426. A reference axis 406 is located at and extends through a center 420 of the object 426. A plurality of reference slices 410 and 411 and object slices 412, 414, and 416 intersect with one another along and include the reference axis 406. An orthogonal cut plane 404 intersects the reference axis 406 orthogonally at one point, for example the center 420 at a depth 422 along the reference axis 406. The intersection of the orthogonal plane 404 with reference slice 410 forms a reference line 424 within orthogonal plane 404. Edges of the object 426 are located along the reference line 424 at opposite sides of the object data.

Figure 5:
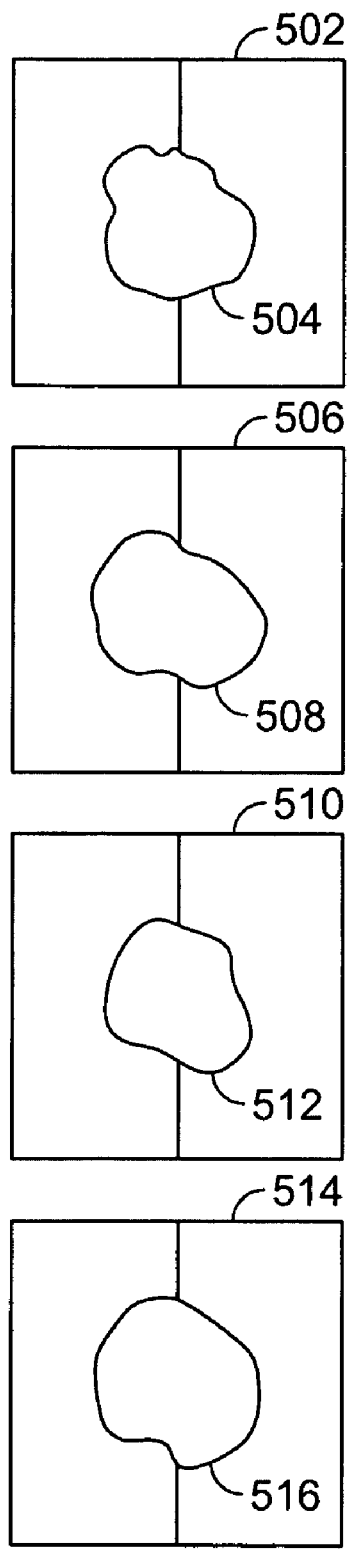
FIG. 5 is a top view of a series of slices through the volumetric data set of FIG. 4 taken at different depths through the object.

FIG. 5 is a top view of a series of slices or cut planes 502, 506, 510, and 514 through the volumetric data set 400 of FIG. 4 taken at different depths 422 through the object 426. The cut planes 502, 506, 510, and 514 are similarly orthogonal to the reference axis 406 as is the cut plane 404. In each of the planes 502, 506, 510, and 514 a contour of the object 426 may be formed. The contours 504, 508, 512, and 516 formed within corresponding planes 502, 506, 510, and 514 depict a boundary where object data meets with non-object data of the VDS 400. A contour model of the entire object 426 may be obtained by generating a large plurality of contours in likewise corresponding cut planes that segment the object 426 along the reference axis 406.

Figure 6:
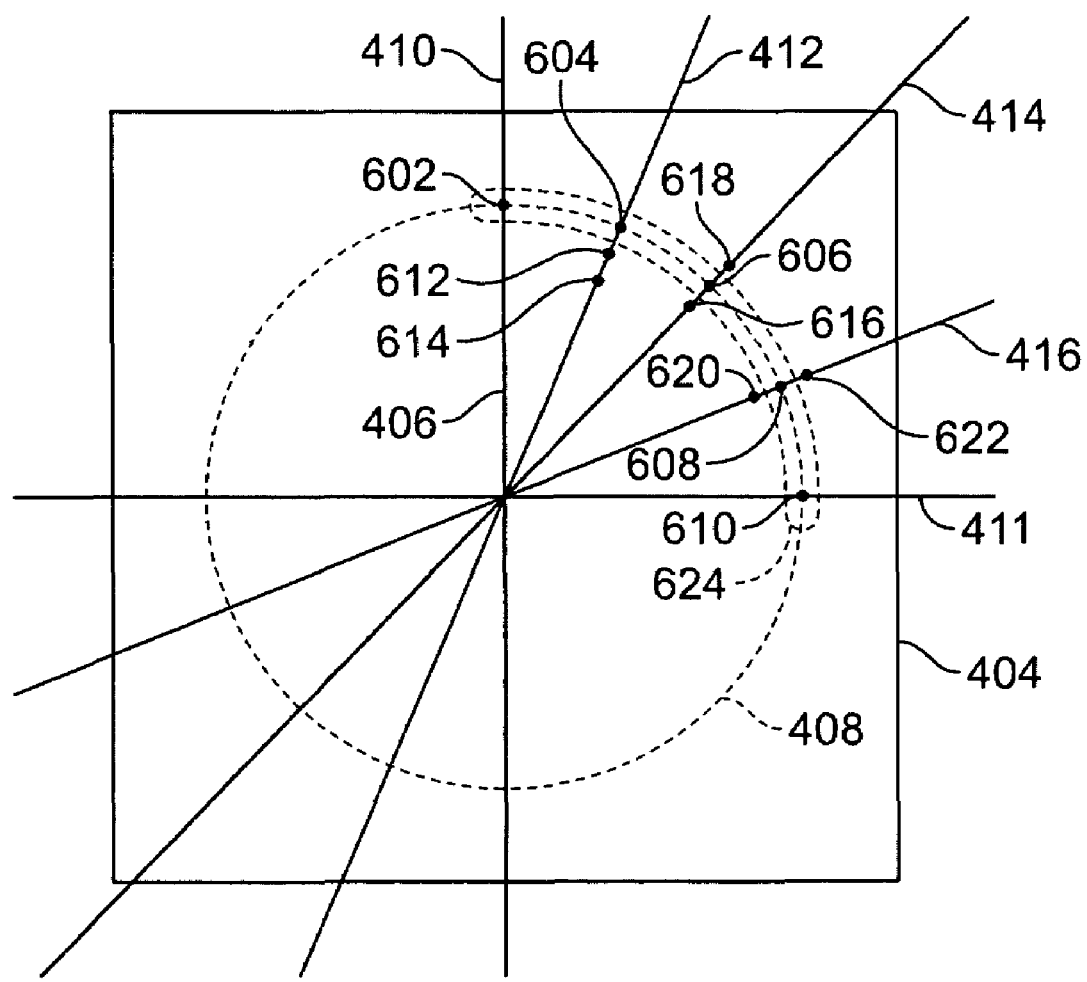
FIG. 6 is a top view of a cut plane and points within the cut plane that estimate a contour of the object of FIG. 4.

FIG. 6 illustrates a top view of the plane 404 of FIG. 4 including the reference and object slices 410, 411, 412, 414, and 416. The reference points 602 and 610, also known as boundary points, each lie in the corresponding reference slices 410 and 411 at a depth 422 (FIG. 4) where the orthogonal cut plane 404 intersects the reference slices 410 and 411. Reference slices 410 and 411 may be orthogonal to each other and may be chosen manually or automatically. Reference points 602 and 610 denote locations on the contour of the object 426 in the corresponding reference slices 410 and 411. Various techniques may be used to identify the reference points 602 and 610 on the boundary of the object 426. Current techniques include, but are not limited to, measures of texture and gray level changes in the image data.

Once the reference points 602 and 610 are located, a smooth estimated contour line 408 is estimated in the cut plane 404. In the example of FIG. 4, the estimated contour line 408 is circular in shape. The estimated contour line 408 intersects the object slices 412, 414, and 416 in proximity to the orthogonal plane 404 at boundary points 604, 606, and 608 correspondingly. A contour estimator determines object points and completes an estimated contour for the other quadrants of FIG. 6 similar to the first quadrant, resulting in an estimated contour 408 for the contour volume 402 at the depth 422. The contour estimator may be included in the segmentation unit 210 of FIG. 2. The contour estimator then completes estimated contours of the contour volume 402 at different depths along the reference axis 406 in proximity to orthogonal cut planes that intersect the reference and object slices. The estimated contours, each contour at a different depth, define a beginning shape, such as the shape of contour volume 402 in FIG. 4, for the object 426. The beginning shape is not too important, e.g. may be spherical, as long as the contours are estimated to reside within the boundary of the object 426.

Figure 7:
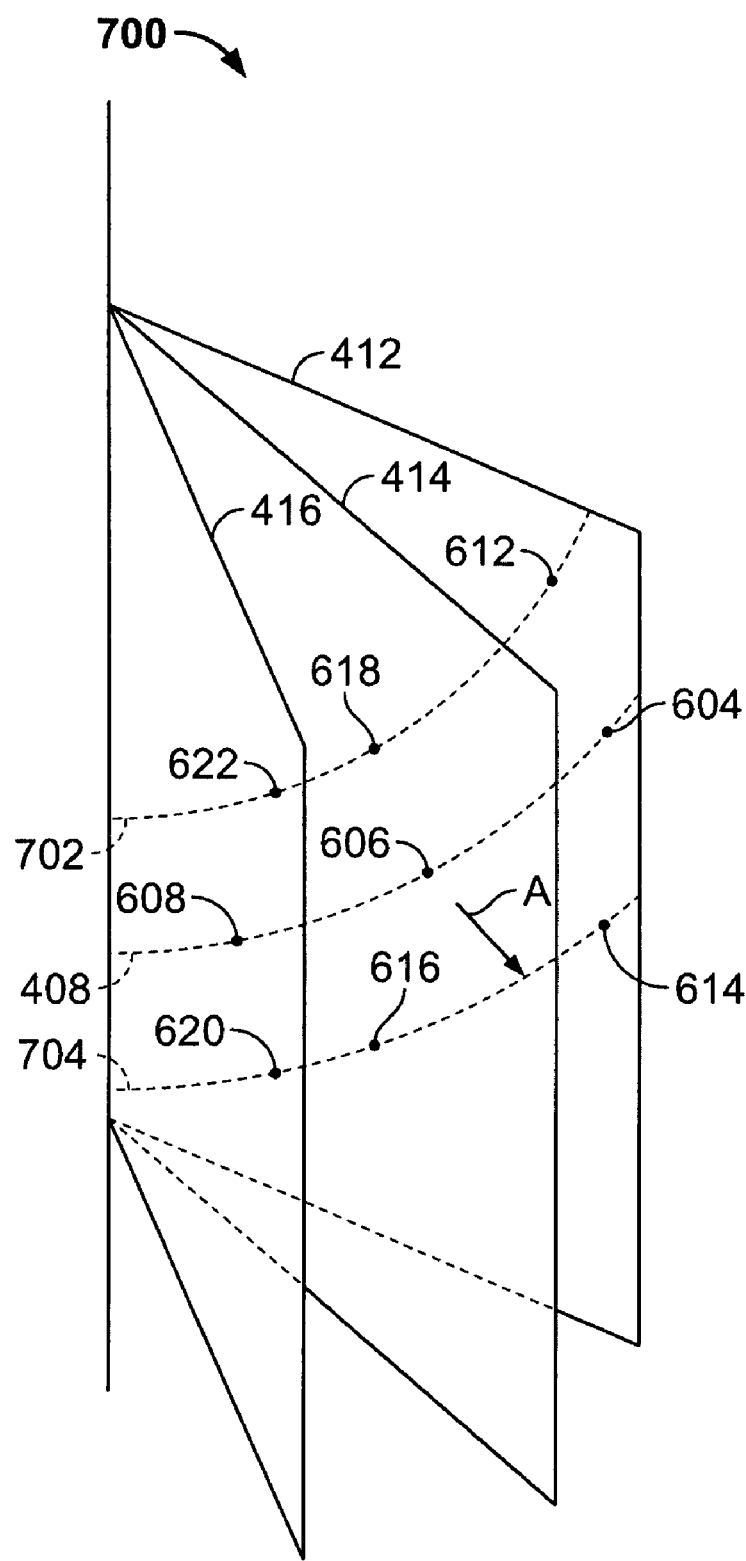
FIG. 7 is a perspective view showing neighboring points within the adjacent slices of FIG. 6.

FIG. 7 illustrates neighboring points 700 on the estimated contours and within the object slices described for FIG. 6. FIG. 7 shows the three object slices 412, 414, and 416 of FIGS. 4 and 6 from a 3D perspective. The point 606 is chosen to exemplify the neighboring points concept. Along the estimated contour 408, point 606 has the neighbors 604 and 608 in the corresponding object slices 412 and 416. The object slices 412 and 416 are adjacent to the object slice 414 which contains point 606. In addition, the points residing in the estimated contours 702 and 704 adjacent to estimated contour 408 may also provide neighbors to point 606. Specifically, object points 612, 618, and 622 of estimated contour 702 and object points 614, 616, and 620 of estimated contour 704 provide neighbors for object point 606. Thus, point 606 may be associated with the eight neighboring points 612, 618, 622, 604, 608, 614, 616, and 620. Alternatively, only points 604, 608, 616, and 618 may be chosen as neighbors for point 606, and point 606 would have four neighbors in this case. In the manner described, a point on an estimated contour may be associated to a set of neighboring points.

Figure 8:
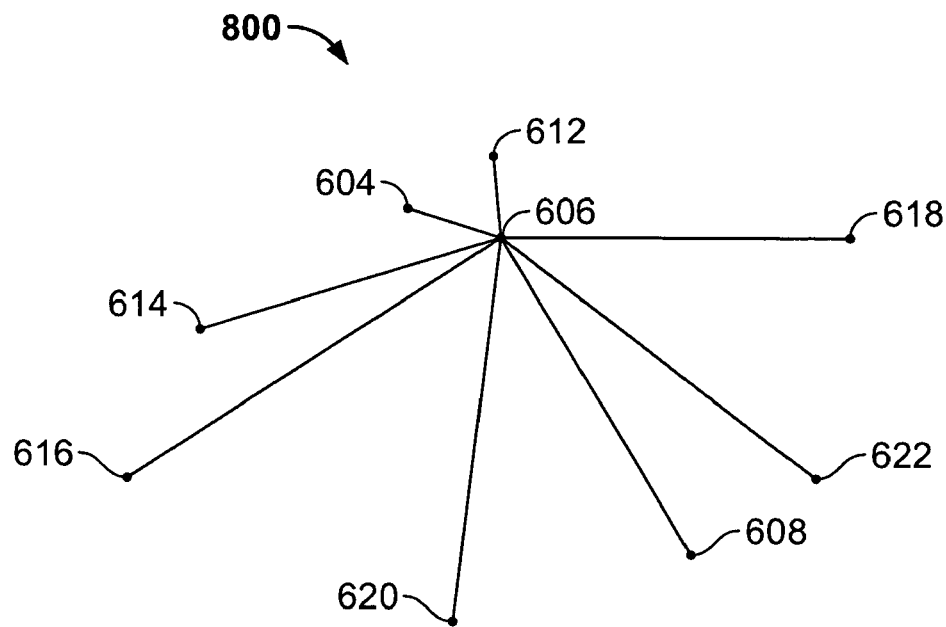
FIG. 8 is a perspective view of neighboring points connected to a point of FIG. 7.

FIG. 8 is another view of the points in FIG. 7 and illustrates a pyramid-like connection 800 between the point 606 and the eight neighboring points 612, 618, 622, 604, 608, 614, 616, and 620 of point 606. Point 606 is the tip of the pyramid, with the surrounding neighboring points forming a base for the pyramid. An exemplary method operates to expand or push the points on the estimated contours, e.g. point 606, outward. An amount a point 606 may move outward is constrained, though, by two types of rules to be discussed shortly herein. In addition to the rules that constrain the amount of outward movement of a point, a point is also constrained to only move within the object slice containing the point.

For example, point 606 may move outwards in the direction of arrow A in FIG. 7, but point 606 may only move within object slice 414 to which point 606 is associated. The associated neighboring points of point 606 may be imagined as having elastic connections to point 606. As point 606 attempts to move outward, the neighboring points 612, 618, 622, 604, 608, 614, 616, and 620 pull back on point 606. The result may be that point 606 moves outward in the direction of arrow A, but not as far as some initially allocated amount as might occur without the backward pulling by the neighboring points. Arrow A points in a direction normal or orthogonal to the point contour at point 606 and indicates the direction point 606 may move. In addition, the neighboring points may be dragged outwards by the movement of point 606, but each neighboring point may only move within the object slice containing the point. In effect, a boundary point is interrelated with neighboring points, the movement of the boundary point affected by the neighboring points and effecting the movement of neighboring points. For example, if a boundary point 606 has an estimated neighboring point such that the difference between the neighboring point and an actual boundary point is very small, the neighboring point may not move, and non-movement of the neighboring point may prevent movement of the boundary point 606 as well.

A first category of rules regulates the outward movement of a point 606 in relation to the neighboring points. In the example of FIG. 8, the mesh of neighboring object points to object point 606 may be used to form a contour at object point 606 which can be measured for smoothness. The object point 606 may be chosen as a vertex point for a plurality of angles formed with neighboring points. For example, object point 606 forms an angle with lines drawn from point 606 to neighboring points 618 and 616. The angle may be notated as a triplet of points, e.g. angle (618,606,616), the middle point of the triplet being the vertex of the angle. Other angles formed with object point 606 are (608,606,604), (622,606,612), and (622,606,614). The measures of the plurality of angles that object point 606 forms with neighboring object points may be used to indicate a sharpness or smoothness of the contour volume 402 at the object point 606, as exemplified in FIG. 9.

Figure 9:
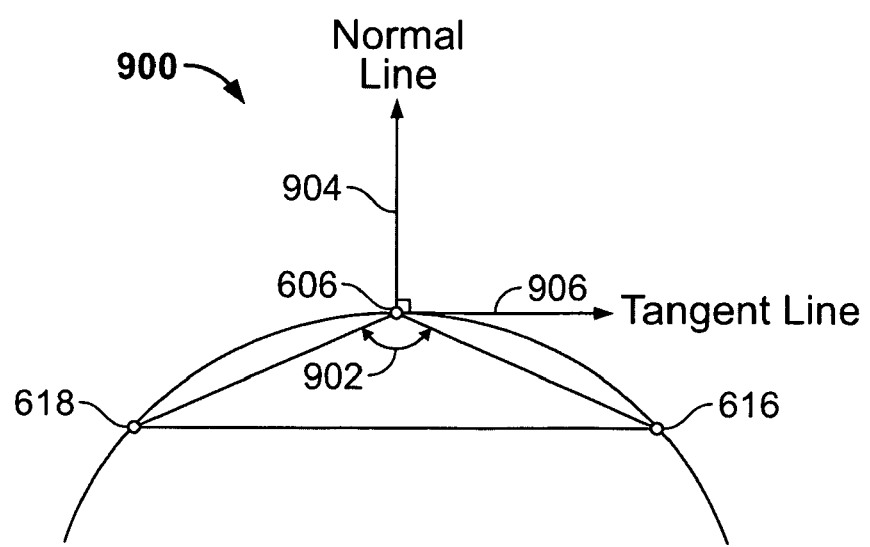
FIG. 9 is an illustration of an angle formed between a point and two neighboring points of FIG. 8.

FIG. 9 exemplifies, using points of FIG. 8, a measure of smoothness 900 of the contour at point 606. FIG. 9 shows the angle (618,606,616), also referenced as angle 902, formed by lines connecting object point 606 to neighboring points 618 and 616 of FIG. 8. The smaller the measure of angle 902, the sharper the contour may be at point 606. The larger the angle 902, the smoother the contour may be at point 606. The measures of angles made by object point 606 with neighboring object points may be correlated to a measure of smoothness of the contour at point 606, and may be used to define a reduction factor. When at a determined time, point 606 is to be moved, point 606 may be allocated a limit of 1 millimeter (1 mm) to move outward along a normal (orthogonal) line 904, line 904 being orthogonal to a tangent line 906 that is tangent to the contour at point 606.

In alternative embodiments, the allocated initial outward movement for a boundary point may be 0.5 mm or 2.0 mm in comparison to 1.0 mm. At the determined time, the contour at point 606 may be very smooth, and the smoothness related reduction factor may only be 0.1 mm. The reduction factor 0.1 mm is subtracted from the initially allocated 1 mm to obtain an allowed movement of 0.9 mm. At the determined time, object point 606 moves 0.9 mm outwards along the normal line 904. At another determined time or iteration for movement of point 606, the contour may be sharper at point 606, and a reduction factor of 0.8 may be calculated. For this iteration, point 606 is moved outward (1−0.8)=0.2 mm along the normal line 904. Measures of smoothness of the contour volume 402 at an object point may be associated with reduction factors that are applied to limit movement of an object point from the initial amount of movement allocated the object point.

When the object point 606 moves along the normal line 904, point 606 exerts a pull on the surrounding neighboring points that may move the neighboring points outwards in their respective object slices as well. The amount of movement allowed for a neighboring point 618 when 606 moves in a direction of arrow A of FIG. 7, is determined by the smoothness of the contour established in object point 606 with its neighboring object points as described in FIG. 8. The amount of movement allowed for a neighboring object point may be limited by reduction rules as described herein.

A second category of reduction rules limit movement of the point 606 outwards and relate to the use of underlying image information in the local area of the point 606. Image information may be used to determine closeness of the object point 606 to the real object 426 contour. If the object point 606 is on the contour of the object 426, the object point 606 should not be moved. Image information may include measures of change in object data, such as gray level changes, gradients of change, local statistics, texture measures, and intensities. From such measures, reduction factors may be developed. For example, if the gray level near the object point 606 is changing dramatically to suggest the boundary of the object 426, a large reduction factor (e.g. 0.9 or 1.0 mm) may be associated with the gray level change. In this case the object point 606 is allowed to move very little (1−0.9=0.1 mm) or not at all (1−1=0 mm).

Reduction factors may be computed or associated with the first and second category of rules described herein. When an object point is to be moved, reduction factors based on smoothness of the contour at the object point and underlying image information in the local of the object point may limit movement of the object point. If the contour is quite smooth and the image information indicates no object boundary near the object point, the object point may be allowed to move the full distance allowed, e.g. 1 mm. Alternatively, if the contour is sharp and/or the image information suggest the object point being at the object boundary, the object point may be moved very little or not at all.

Figure 10:
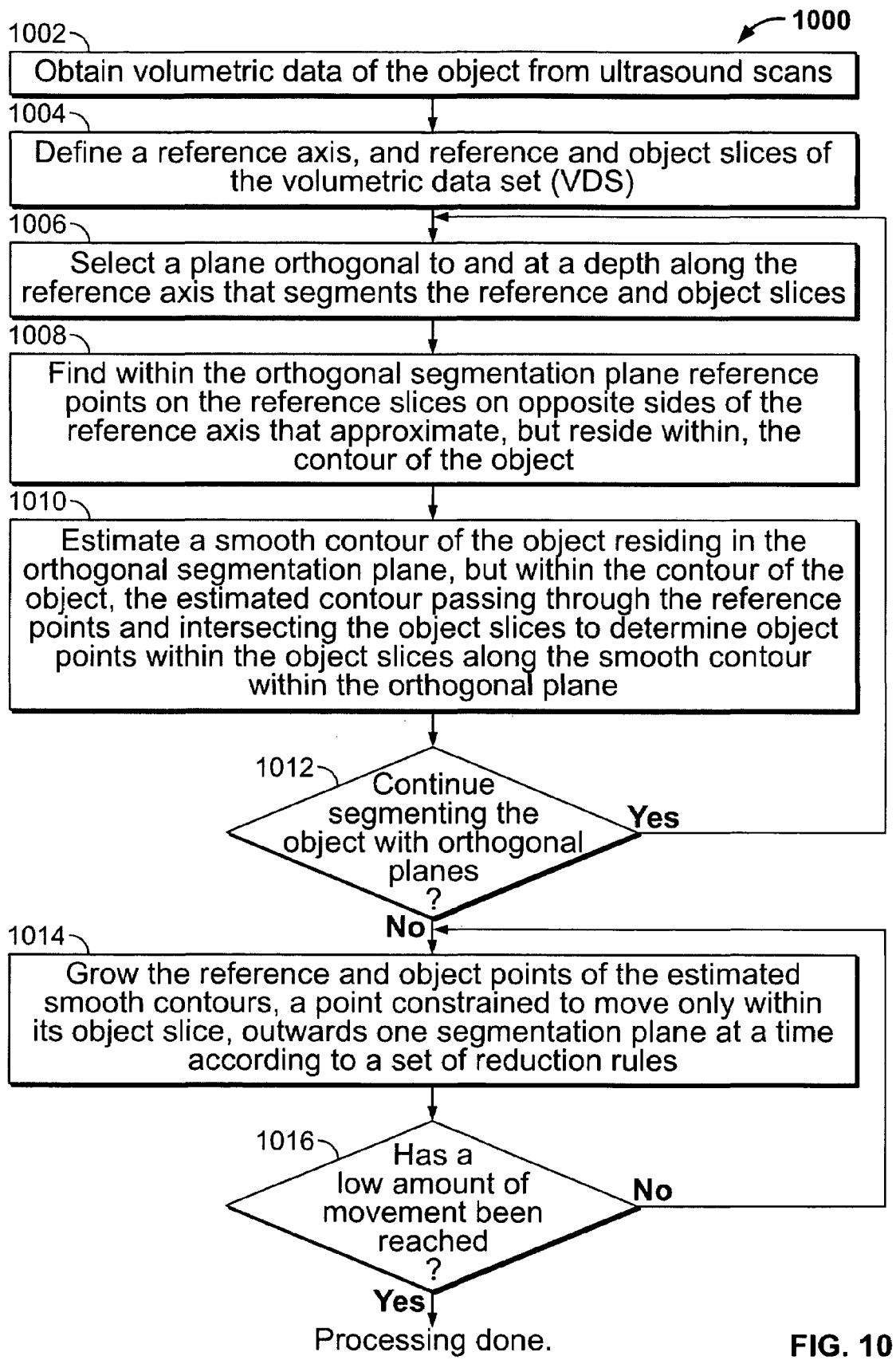
FIG. 10 is a flowchart of an exemplary method for segmenting a volumetric data set of an object.

FIG. 10 is a flowchart 1000 that describes an exemplary method for segmenting a volumetric data set (VDS) 400. At 1002, the VDS 400 is obtained with object data and non-object data in proximity to the object data. In the example of FIG. 4, the object data defines an object 426 that is surrounded by non-object data. At 1004, reference slices 410 and 411 and object slices 412-416 of the VDS 400 are defined with and relative to a reference axis 406 that may include and pass through a center of the object 426 (FIG. 4). The reference slices 410 and 411 and object slices 412-416 intersect one another along the reference axis 406 and contain the reference axis 406. At 1006, a plane 404 orthogonal to and at some depth along the reference axis 406 is selected. The plane 404 intersects the reference and object slices 410-416 thereby defining reference lines 424 and object lines 427 within the orthogonal segmentation plane 404.

On each reference line 424, the method finds at 1008 a pair of reference points, each on opposite edges of the object 426 that approximate, but reside within, the contour of the object 426. Optionally, the reference points may be automatically determined based on the data content of the reference slice 410. Alternatively, reference slice 410 may be presented to the user who designates the reference points manually with a mouse, trackball, touchscreen and the like. At 1010, the method then estimates a smooth contour line 408 of the object 426 residing in the orthogonal segmentation plane 404, but within the contour of the object 426. The estimated contour line 408 passes through the reference points 602 and 610 (FIG. 6), and based on the reference points 602 and 610, intersects the object line of the object slices 412-416 to determine estimated object points 604, 606, and 608 correspondingly. The estimated contour resides at a depth determined by the cut plane 404 and within the true contour of the object 426. The method determines 1012 whether segmentation of the VDS 400 with orthogonal cut planes, and the formation of estimated contours of the object 426, is complete.

Segmentation may be complete when a predetermined number of orthogonal cut planes segment the entire VDS 400 along the reference axis 406, and obtain the contour points 624, which include reference points 602 and 610, and object points 604, 606, and 608, associated with each cut plane. If segmentation is not complete, processing returns to 1006 from 1012 to select another cut plane for segmenting the VDS 400. If segmentation is complete, an iterative process begins at 1014 that grows the estimated smooth contours in each cut plane outward toward the actual contour of the object 426. A boundary adjustment unit, e.g. the volume rendering processor 212 of FIG. 2, adjusts boundary points 624 outwards until corresponding substantially to the actual boundary points of the object 426. A first iteration is performed whereby the boundary points 624 for all the estimated contours are allowed to grow outwards. Each boundary point 624 may be selected to move a limited distance outward along a line normal to the contour of the point. The maximum distance a point moves in one operation is limited to a predetermined amount, e.g. 1 mm. The movement of the boundary point 624 is restricted to be within an associated object slice.

However, the amount of outward growth allowed for each boundary point 624 may be adjusted from the initial predetermined amount by a set of reduction factors. Boundary points 624 are allowed to grow outwards within the constraints of reduction rules/factors. Thus, for example, a point may be allocated 1 mm of movement initially, but with a reduction factor of 0.3, only be moved 1.0–0.3=0.7 mm. The growth of a point outwards also drags surrounding neighboring points outwards as well. After boundary points 624 related to an orthogonal segment are grown outwards, another segment of boundary points 624 is selected for outward growth. The process of growing boundary points outwards continues until all segments of boundary points have been grown. When one iteration of growing the boundary points 624 has completed, the method determines 1016, based on some criteria of low overall growth or movement, whether another iteration of growth is to be done for the segments.

In one embodiment, growth of boundary points 624 is complete when some predetermined low number or percentage of boundary points 624 move. In another embodiment, growth may be complete when some predetermined low number or percentage of boundary points 624 move within some predetermined small amount. In yet another alternative embodiment, growth may be complete when the rate of movement of all the boundary points 624 becomes less than some predetermined amount. Once outward growth of boundary points 624 is determined 1016 complete, the resulting 3D contour volume 402 formed by the boundary points 624 substantially models the object 426.

Exemplary embodiments of diagnostic ultrasound systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for three dimensional (3D) segmentation of an object, comprising:
   obtain a volumetric data set containing object data and non-object data in proximity to said object data, said object data having a reference axis extending through said object data;
   defining at least one reference slice and multiple object slices within said volumetric data set, said reference slice and said object slices intersecting one another along said reference axis and containing said reference axis;
   determining, within said reference slice, reference points at edges of said object data;
   generating an estimated contour extended through said reference and object slices based on said reference points, said estimated contour intersecting said object slices to define estimated contour points; and
   adjusting said estimated contour points until corresponding substantially to actual contour points of the object data.

2. The method of claim 1, further comprising, adjusting said estimated contour point within a first object slice based on a difference between estimated and actual contour points in a second object slice.

3. The method of claim 1, wherein said obtaining includes obtaining a volumetric data set containing object data, non-object data surrounding said object data, said object data having said reference axis located at and extending through a center of said object data.

4. The method of claim 1, wherein said defining includes defining orthogonal reference slices and said determining includes determining pairs of reference points in each of said orthogonal reference slices.

5. The method of claim 1, wherein said estimated contour is substantially a circle.

6. The method of claim 1, further comprising repeating said defining, determining, generating and adjusting at multiple depths within said reference and object slices, where depth is in a direction extending parallel to said reference axis.

7. The method of claim 1, further comprising establishing limits for an amount that estimated contour points are adjusted in one operation.

8. The method of claim 1, wherein said estimated contour points are adjusted in an iterative manner until corresponding substantially to said actual contour points.

9. The method of claim 1, further comprising determining a direction in which to adjust said estimated contour point based on a line normal to said estimated curve.

10. The method of claim 1, further comprising, for each object slice, determining a first distance to adjust said estimated contour point and reducing said first distance based on object data and a smoothness of said estimated contour.

11. The method of claim 1, further comprising reducing an amount to adjust said estimated contour point based on at least one of a gradient characteristic, local statistics, texture measurements, and a smoothness of said estimated contour.

12. The method of claim 1, wherein said adjusting is performed in an iterative manner until a predetermined percentage of said estimated contour points are not moved during an adjustment iteration.

13. A system for three dimensional (3D) segmentation of an object, comprising:
   memory storing a volumetric data set containing object data and non-object data in proximity to said object data, said object data having a reference axis extending through said object data;
   a processing unit defining at least one reference slice and multiple object slices within said volumetric data set, said reference slice and said object slices intersecting one another along said reference axis and containing said reference axis, said processing unit determining, within said reference slice, reference points at edges of said object data;
   a contour estimator generating an estimated contour extended through said reference and object slices based on said reference points, said estimated contour intersecting said object slices to define estimated contour points in each object slice;
   a contour adjustment unit adjusting said estimated contour points until corresponding substantially to actual contour points of the object data.

14. The system of claim 13, wherein said contour adjustment unit adjusts said estimated contour point within a first object slice based on a difference between estimated and actual contour points in a second object slice.

15. The system of claim 13, wherein said processing unit defines orthogonal reference slices and determines a pair of reference points in each of said orthogonal reference slices.

16. The system of claim 13, wherein said processing unit, contour estimator and contour adjustment unit repeat said defining, determining, generating and adjusting operations at multiple depths within said reference and object slices, where depth is in a direction extending parallel to said reference axis.

17. The system of claim 13, wherein said contour adjustment unit establishes limits for an amount that estimated contour points are adjusted in one operation.

18. The system of claim 13, wherein said estimated contour points are adjusted in an iterative manner until corresponding substantially to said actual contour points.

19. The system of claim 13, wherein said contour adjustment unit determines a direction in which to adjust said estimated contour point based on a line normal to said estimated curve.

20. The system of claim 13, wherein said contour adjustment unit determines, for each object slice, a first distance to adjust said estimated contour point and reduces said first distance based on object data and a smoothness of said estimated contour.

21. The system of claim 13, wherein said contour adjustment unit reduces an amount to adjust said estimated contour point based on at least one of a gradient characteristic, local statistics, texture measurements, and a smoothness of said estimated contour.

22. The system of claim 13, wherein said contour adjustment unit adjusts said estimated contour points in an iterative manner until a predetermined percentage of said estimated contour points are not moved during an adjustment iteration.

* * * * *